United States Patent [19]

Crozier et al.

[11] Patent Number: 4,519,047

[45] Date of Patent: May 21, 1985

[54] PRINTER WITH POSITIONAL TABBING

[75] Inventors: George W. Crozier, Hatfield; Bernard J. McDevitt, Norristown, both of Pa.

[73] Assignee: Sperry Corporation, New York, N.Y.

[21] Appl. No.: 360,759

[22] Filed: Mar. 22, 1982

[51] Int. Cl.³ ............................................. G06F 3/00
[52] U.S. Cl. .................................................. 364/900
[58] Field of Search ............................ 364/200, 900

[56] References Cited

U.S. PATENT DOCUMENTS 4,392,197 7/1983 Couper et al. ..................... 364/200

Primary Examiner—Gareth D. Shaw
Assistant Examiner—John G. Mills
Attorney, Agent, or Firm—James R. Bell; Thmas J. Scott; Marshall M. Truex

[57] ABSTRACT

A printing system incorporates a character generator having circuitry for the generation of proportional width printing. Further circuitry is utilized in conjunction with the foregoing circuitry to operate the system in a tabular mode for the columnar presentation of printed material. Two memories are employed. One memory stores data as to the components of characters which are to be printed, the data being stored in predesignated sets of addresses. Each of these components may be addressed by an address counter preset for counting through the set of addresses of a selected character. A tabbing or print signal is stored in the second memory to serve as position data in the tabbing mode. The second memory is addressed concurrently with a scanning of a print line whereby the stored data corresponds to a position on the print line. A comparator signifies the concurrence of a tab signal and the address counter of the first memory with the addressing of the print signal in the second memory, a compare designating the instant for initiating the printing of a further character. Thereby, most of the circuitry of the character generator can be utilized in both modes of the printing for reduced complexity and increased reliability.

11 Claims, 3 Drawing Figures

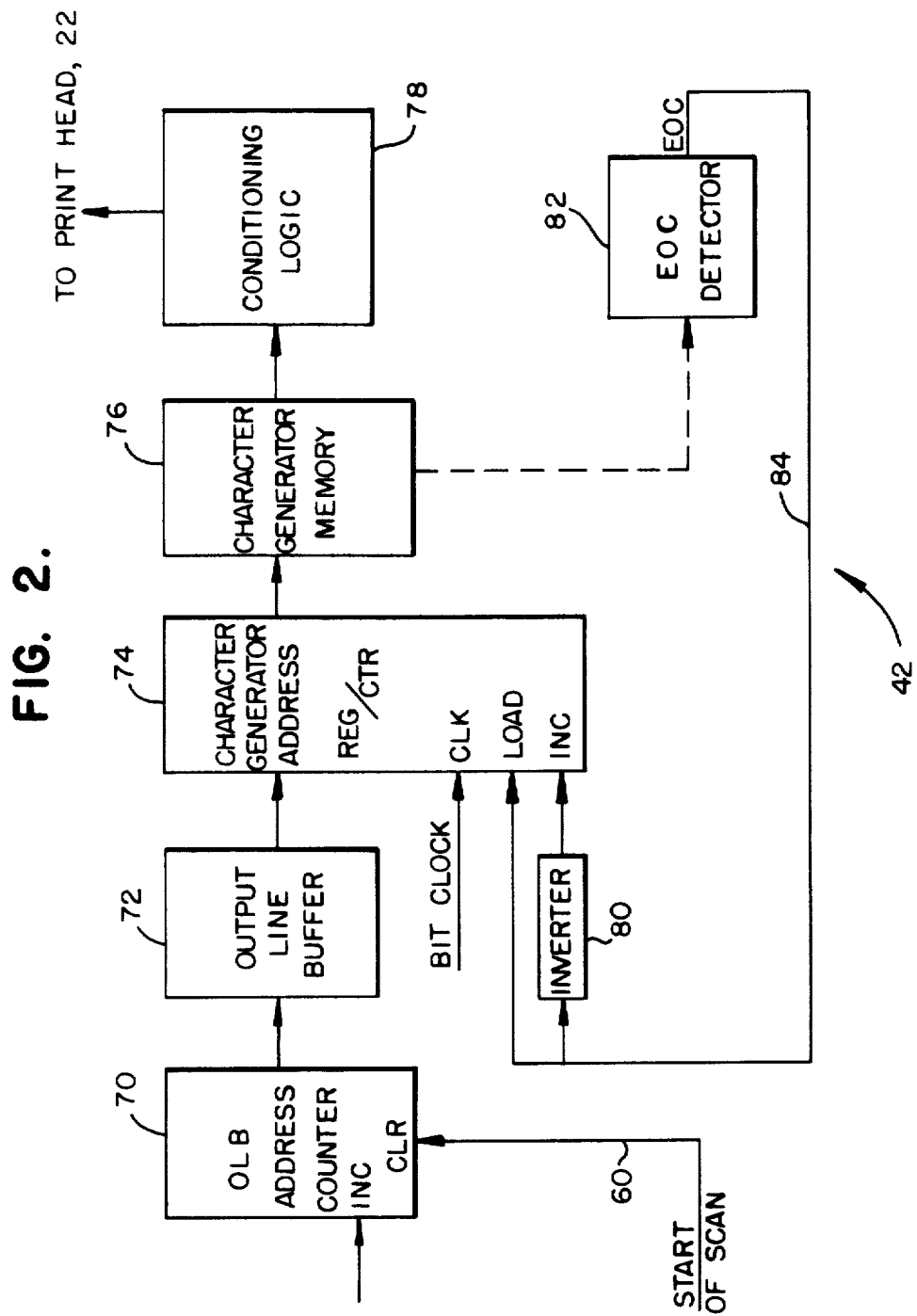

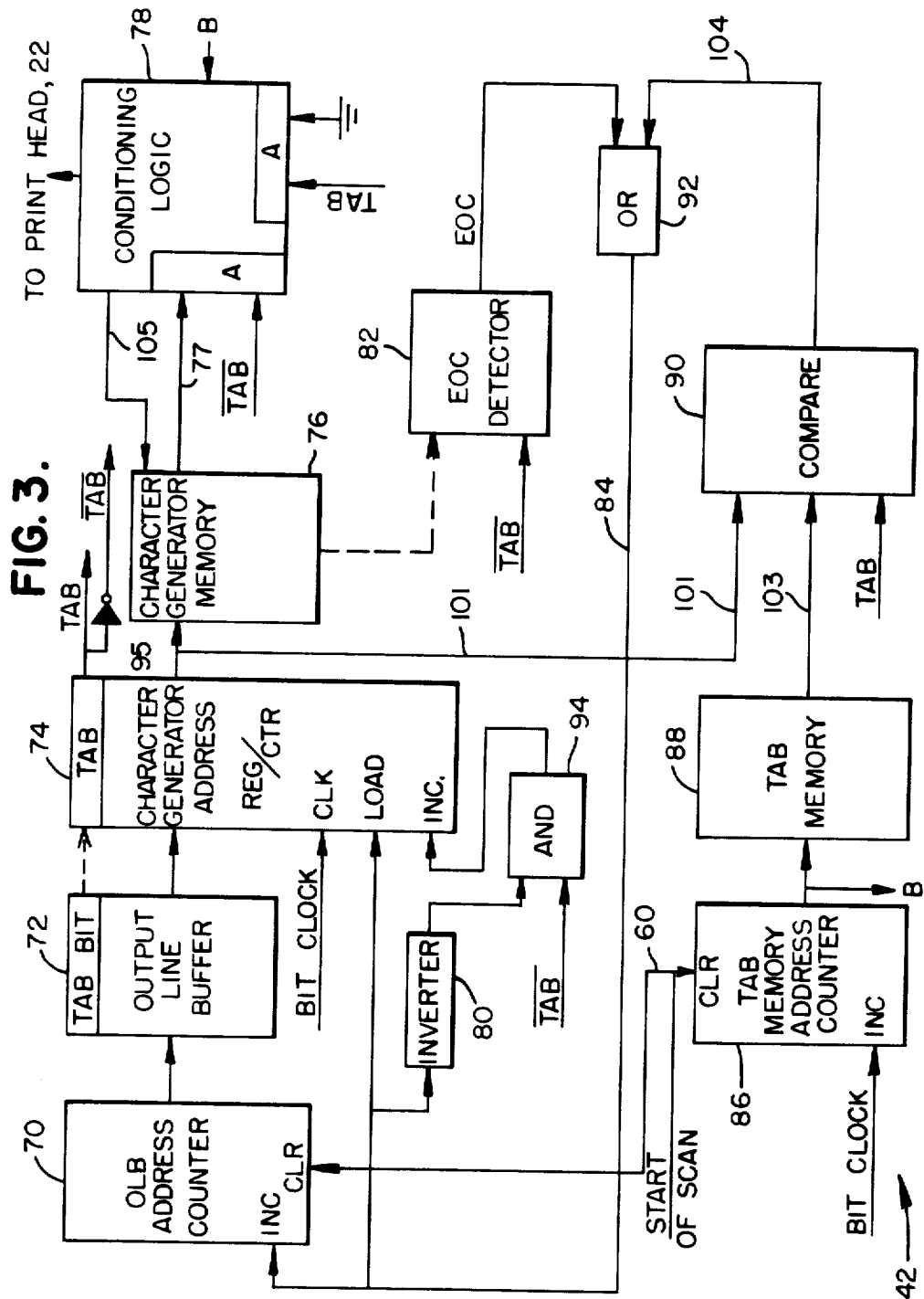

PRINTER WITH POSITIONAL TABBING

BACKGROUND OF THE INVENTION

1. Field of the Invention

This invention relates generally to electrical computers and data processing systems particularly printing systems providing varied spacing between the centers of alpha-numeric characters in proporation to the widths of the characters and, more particularly, to such a printing system further incorporating a tabbing function.

2. Description of the Prior Art

Printing systems comprise a printer and electronic circuitry for the control of the printer. A printer may be constructed in a variety of forms such as a flying spot scanner in television-type displays, laser beam scanning by multifaceted rotating mirrors upon a photosensitive medium, and electrical excitation of a stylus upon an electrophoretic medium. The electronic control circuitry includes some form of character generator with scanning and position control units.

In the design of such systems, consideration is given to the spacing between centers of the alpha-numeric characters which are to be printed on a screen or on hard copy such as paper. When thus spacing is equal, in which case all characters are allotted the same cell size, wide characters appear to be more closely spaced than narrow characters. In order to present a more pleasing appearance to the printed text, proportional width printing has been introduced to provide a variation in the cell size allocated to each character in proportion to the width of the character. A uniform spacing is thereby maintained between the leading and trailing edges of each cell and, correspondingly, between each character for a more pleasing uniformity to the text.

However, a problem arises with proportional width printing in the case of presenting data in columnar fashion. The problem is most readily understood with reference to the construction of the printing system. In order to provide for the proportional width printing, the character generator must signal the conclusion of the printing of a character before the printing of the next character can be commenced. Such a signal is designated as an end of character (EOC) flag. Upon each occurrence of the EOC flag, the instruction for the next character is transmitted to the character generator.

However, in a columnar presentation as appears in newspaper-like format, such as that having two or more columns of text information side-by-side on a page, the leading edges of the characters along the left margin of each column are to be aligned with a vertical line. Thus, the positioning of a character is no longer keyed to the end of a previous character, but is keyed to the location of the column. In order to determine the starting point of a character in such columnar presentation, it has been the practice to utilize a computer within the printing system to calculate the amount of space required between two successive characters based on the spacing between the last character in a print line of a column and the first character in the same print line of the next column.

The foregoing illustrates limitations of the known prior art. Thus, it is apparent that it would be advantageous to provide an alternative directed to overcoming one or more of the limitations as set forth above. Accordingly, a suitable alternative is to provide a printing system including the functions of both the proportional width and the columnar presentation without the necessity of the foregoing calculations.

SUMMARY OF THE INVENTION

In one aspect of the invention this is accomplished by providing a printing system comprising a medium and means for printing characters on the medium. Other means, such as first and second counters, are coupled between the printing means and the medium for combining the presentation of printed characters on the medium in the modes of proportional width and columnar presentation. The first counter is for addressing components of a character and the second counter is for counting a spacing to columns of characters during the columnar presentation.

The foregoing features and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 2 is a block diagram illustrating a portion of the character generator of FIG. 1 relating to proportional width printing; and FIG. 3 is a block diagram illustrating the character generator showing the interconnection of the circuitry to provide both the proportional width and columnar presentation in accordance with an embodiment of the invention.

DESCRIPTION OF THE PREFERRED EMBODIMENT

Figure 1:
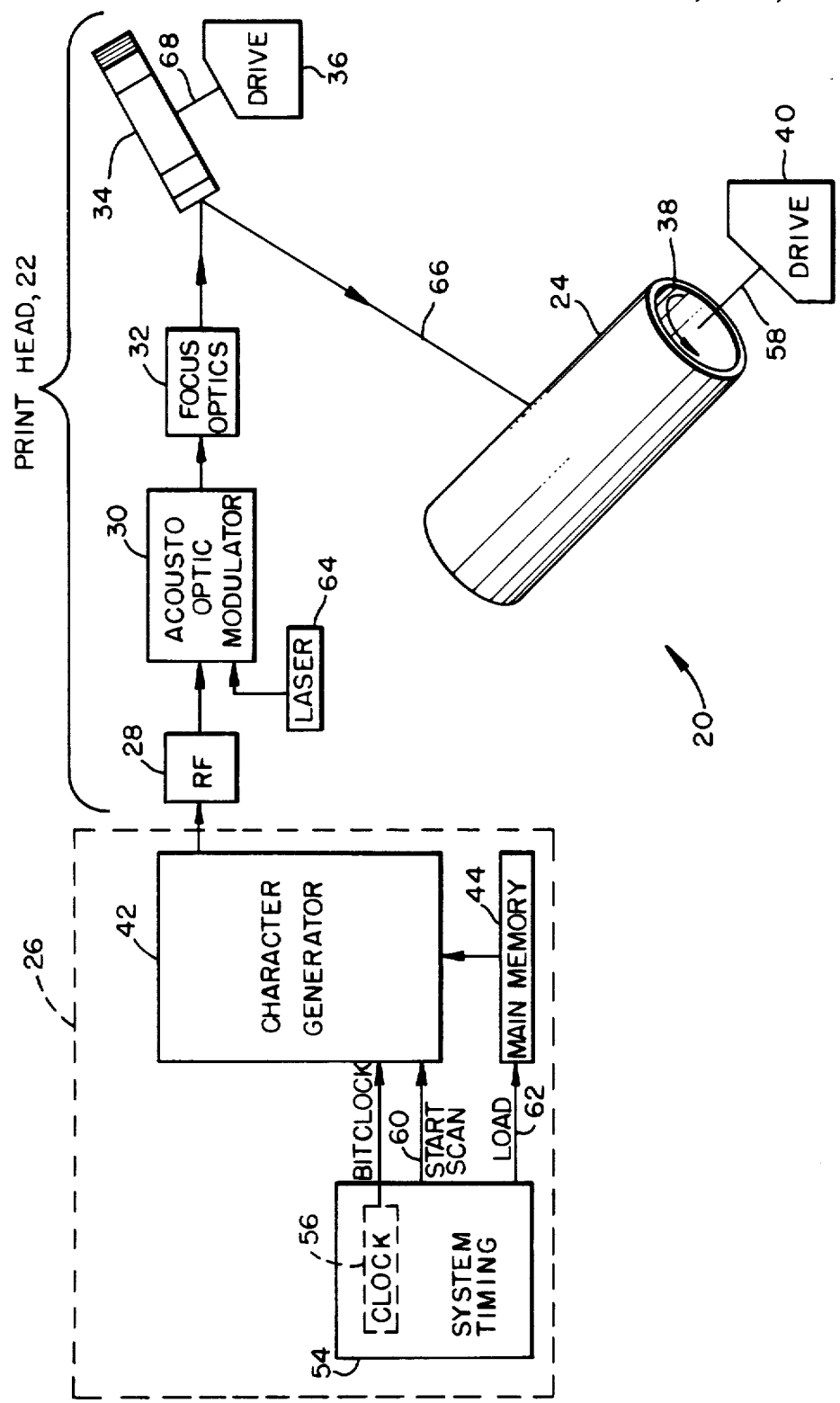
FIG. 1 illustrates a printing system incorporating an embodiment of the invention, a portion of the figure being in block diagrammatic form and including a character generator.

Referring now to FIG. 1, a printing system 20 incorporates the invention to provide the proportional width mode and the columnar mode of presentation of printed material. The system 20 comprises a print head 22, a recording medium 24 and electronic, character-generation equipment 26. The print head 22 forms characters upon the medium 24 as directed by the equipment 26. The equipment 26 controls the form, size and spacing of the characters printed on the medium 24. The characters may be any form of alpha-numeric characters.

The print head 22 and the medium 24 are shown as an exemplary electro-optic printer, it being understood that the invention applies equally well to the electrophoretic printing and to television (or cathode ray tube)-type displays. The print head 22 comprises a RF (radio frequency) generator 28, an acoustic-optic modulator 30, focusing optics 32, a rotatable multi-faceted mirror 34, and a motorized drive 36 for rotating the mirror 34. The recording medium 24 is photosensitive and is mounted upon a drum 38 which is rotated by a motorized drive 40. The equipment 26 comprises a character generator 42, a main system memory 44, and a system timing unit 54 which includes a clock 56. The character generator 42 includes features of the invention as will be described subsequently with reference to FIGS. 2 and 3.

In operation, the character generator 42, the drive 36 and the drive 40 are synchronized by timing signals provided by the timing unit 54. The timing of the operation of the generator 42 is accomplished by a clock signal from the clock 56, the clock signal being at the bit rate that corresponds to the rate at which components of individual ones of the alpha-numeric characters are to be generated. The drive 40 increments the angular orientation of the drum 38 about a shaft 58 preparatory to the printing of each line of print. In correspondence with the advancement of the angular position of the mirror 36, the timing unit 54 provides a start-scan signal on line 60 to the generator 42 to signal the generator 42 to begin a new line of print. Concurrently with the start-scan signal on line 60, the timing unit 54 also provides a load signal on line 62 for loading character data from the main memory 44 into the generator 42 for the printing of a line of print.

The character generator 42 is capable of providing the proportional width printing in combination with the columnar presentation of printed material upon the recording medium 24. Since the implementation of the columnar presentation follows a tabbing operation, the signal initiating the tabbing function is designated as the TAB signal. The selection of the proportional width mode and the tabbing mode is governed by the TAB signal stored within the memory 44 as will be described subsequently.

The output electrical signals of the generator 42 may be of a suitable format to drive the specific form of print head to be utilized. For example, each component of a character may be represented by either an analog or digital voltage signal. In the case of the exemplary electro-optic apparatus of the print head 22, the system 20 is understood to print by means of a matrix of dots for each character. The generator 42 provides a relatively high voltage to the RF generator 28 when a dot is to be presented upon the medium 24. The generator 42 provides a relatively low voltage to the RF generator 28 when a blank is to be presented upon the medium 24.

In response to the foregoing voltage levels from the generator 42, the generator 28 applies an RF signal to the modulator 30 which modulates a beam of light provided by a laser 64. The modulated beam of light is applied by the focusing optics 32 and the mirror 34 to the medium 24. The modulator 30 is of a well known acousto-optic form wherein, in response to RF voltages of the generator 28, acoustic vibrations are established within the modulator 30 and cause a portion of the input light beam from the laser 64 to be diffracted through a specific angle, called the Bragg angle, along a deflected path. It is the deflected path which is transmitted via the optics 32 and the mirror 34 to the medium 24. Also, as is well known, the individual facets of the mirror 34 scan the beam 66 along a print line of the medium 24 in response to angular rotation of the facet about the shaft 68 of the mirror 34.

The speed of rotation of the mirror 34, as well as the length of the dwell time of the beam 66 within the region occupied by a scan line on the medium 24, are synchronized with the speed of character generation of the generator 42 and with the times of occurrence of the scan signal on line 60 and the load signal on line 62. Thereby, successive lines of print are generated in a format corresponding to the proportional width printing or to the columnar presentation. In response to each voltage pulse supplied by the generator 42 to the RF generator 28, the generator 28 provides an RF signal which causes the modulator 30 to deflect the light beam for providing a dot in the character matrix on the medium 24. The termination of the RF signal from the generator 24 terminates the generation of the deflected beam to provide a blank spot on the medium 24.

Referring now to FIG. 2, the character generator 42 comprises an address counter 70, a buffer storage unit 72 storing data for each of a succession of output lines and being addressed by the counter 70, an address counter 74 constructed with a register (not shown) to enable presetting of the counter 74 with a number provided by the storage unit 72, a character memory 76 addressed by the counter 74, a conditioning logic unit 78, inverter 80, and an output circuit of the memory 76 in the form of an end-of-character flag detector 82. The foregoing elements of the character generator 42 comprise only a portion of the generator 42, this portion being utilized for the printing of characters in the proportional width mode. The character memory 76 stores all data required for the printing of each of the alpha-numeric characters. The output-line buffer-storage unit 72 is loaded with the information required for the printing of a full line of printed material, the information being loaded into the storage unit 72 from the main memory 44 of FIG. 1 in response to the occurrence of the load signal on line 62. Although diagramatically shown as a separate entity in FIG. 2, the output-line buffer-storage unit can be part of the main memory shown in FIG. 1.

In operation, the starting of the printing of characters during a scanning of a print line by the beam 66 of FIG. 1 is initiated by the start-scan signal on line 60. The signal on line 60 clears the address counter 70 and resets it to the count of the first address of the storage unit 72. Thereafter, in accordance with the occurrences of the EOC flag signals on the line 84, it counts further addresses. The count of the counter 70 is incremented to the next count in accordance with the occurrence of each flag signal on line 84.

A set of storage locations is reserved for the components of each character in the character memory 76. Each character can be identified by the starting address of the set of locations which are to be subsequently addressed during the generation of each component of the character. Thus, the requisite information stored in the storage unit 72 for identifying each character is simply the starting address of each character.

The address counter 74 is pre-set with the starting addresses of the character which is to be printed. The pre-setting of the counter 74 is accomplished by loading the starting address from the storage unit 72 into the register of the counter 74 in response to the flag signal on line 84. Thereupon, in response to each occurrence of a bit-clock signal from the clock 56 of FIG. 1, the counter 74 addresses the character memory 76 with a set of addresses beginning with the starting address of the character to be printed.

During the printing of the various components of the character, it is noted that some of the print signals are dots while others are blanks so as to portray each character in the form of a dot matrix presentation. At the conclusion of the formation of the character being printed, the memory 76 outputs a signal designating the completion of the character, that signal being detected by the detector 82 which, in turn, provides the EOC flag signal on line 84. Thereby, the generator 42 is ready to begin the printing of a character upon the completion of the printing of the previous character. The amount of time devoted to the printing of each character is dependent on the size of the character and thus, more time is devoted to the printing of a wide character such as a letter "M" as compared to a letter "I". However, the spacing between the leading and trailing edges of successive characters is the same, this information residing in the character generator memory as part of the character being printed.

As a practical matter in the implementation of printing systems, it is noted that the beam 66 of FIG. 1 is made to traverse the medium 24 in a succession of scans, each scan being free of any retrace movement as would be required to print a complete character during a single scan. Accordingly, the representation of the stored character components in the memory 76 is understood to be only the top portion, bottom portion, or some other portion of the character being printed in accordance with the number of scan lines used to portray a single line of print. Since, as noted herein above, the character generator 42 is operable with a variety of forms of print head, the print head 22 being merely exemplary, the starting addresses in the storage unit 72 may be either the starting addresses of the top portion, bottom portion, or other portions of the characters being scanned, or may be the starting address of the complete characters in the event of the utilization of a print head employing retraced strokes in the manner of a stroke-writing character generation.

The conditioning logic unit 78, in response to clock pulse signals B, adjusts the duration of dots in the dot matrix presentation of characters to compensate for the tangential velocity of the sweeping beam 66 as it sweeps across recording medium 24. This provides a more uniform appearance to the characters to compensate for the slight changes in speed of the tangential velocity of the scanning beam. The conditioning logic also provides ancilliary addressing to the character memory so as to address the components of a character residing on the first, second or subsequent scan lines in a print line. Since each line of printed text is composed of several scan lines of the scanning beam 66, only those components of a character line on a specific one of the scan lines are to be addressed during any one sweep of the beam 66. Accordingly, the conditioning logic unit counts the occurrences of the individual ones of the scan lines and provides the appropriate ancilliary address to the character memory to provide for the extraction of the requisite components of the characters being printed.

With respect to the operation of the address counter 74, it is noted that the flag signal on line 84 is also applied by the inverter 80 to a terminal of the counter 74 allowing the counting to proceed. Thus, the flag signal acts as a gate during which the complimented flag establishes the interval during which the counter 74 can count while the flag itself designates the instant when the counter 74 is to be preset with the value of address loaded into the counter 74 from the storage unit 72. For a more detailed description of the printing of characters in the proportional width mode, see U.S. patent application entitled, "End of Character Flag for Variable Pitch Character Generator", invented by Bernard J. McDevitt, Ser. No. 121,845, filed on Feb. 15, 1980, which is expressly incorporated herein by reference.

Referring now to FIG. 3, there are shown the components previously seen in FIG. 2 and, furthermore, the components relating to the columnar presentation of printed matter by means of the tabbing function. Thus, in addition to the aforementioned components portrayed in FIG. 2, the character generator 42 further comprises an address counter 86, a tab memory 88 which is addressed by the counter 86, a comparator 90, an OR gate 92, and an AND gate 94. The connections in the simplified drawing of FIG. 2 have been altered somewhat to accommodate the interconnections between the components for the tabbing function for the columnar presentation and the components for the proportional width printing. The TAB signal of FIG. 3 is stored separately from the character address within the storage unit 72, from where it is applied to the counter 74. Presetting the counter to the value of the TAB signal stops the operation of the character memory 76 since the TAB signal is not a valid address. The complemented TAB signal is obtained from the TAB signal via the digital inverter 95.

The inverter 80 is connected via the AND gate 94 to the incrementing terminal of the counter 74. The complemented TAB signal is also applied as an input to the AND gate 94. The detector 82 is coupled by the OR gate 92 to the line 84. The output terminal of the comparator 90 is coupled to the second input terminal of the OR gate 92. Both the start-scan signal on line 60 and the bit-clock signal are coupled to the address counter 86. The TAB signal is coupled to the comparator 90, and the complemented TAB signal is coupled to the detector 82. The TAB and complemented TAB signals may also be coupled to the conditioning logic unit 78, if desired, to provide blanks.

In operation, both the EOC flag and a compare signal are coupled via the OR gate 92 to the line 84 for initiating the formation of the next character. The complemented TAB signal serves to activate the detector 82. Since the TAB signal, itself, is coupled to the comparator 90 while the complemented TAB signal is coupled to the detector 82, the EOC flag of the detector 82 and the compare signal of the comparator 90 are coupled alternately to the line 84 depending on the state of the TAB signal. Thereby, the end of a character occurs upon the presence of the EOC flag in the proportional width mode while the end of TAB (EOT) occurs upon the presence of the compare signal in the tabbing mode for the columnar presentation of the printing.

In accordance with a feature of the invention, the tabbing functions are accomplished by stopping the operation of the counter 74 and the memory 76 during the interval of time in which the print head 22 of FIG. 1 scans the beam 66 between the end of the last character before the tabbing function begins and the first character after the tabbing function has been completed. In operation, the time of stopping is provided by use of the TAB signal stored in the storage unit 72. The duration of the interval of time during which the counter 74 and the memory 76 remains inactive is controlled by the counter 86, the memory 88 and the comparator 90.

The counter 86 is incremented by clock-pulse signals occurring at a rate proportional to the rate of scanning by the print head 22. Thus, the address provided by the counter 86 to the memory 88 represents the position of the scanning beam on a print line. As the counter 86 counts during the duration of the scanning of a print line, the successive addresses of each tab position on the print line are applied to the memory 88. The memory 88 stores TAB values of the left-hand margin of each column which may be skipped to, assuming that the scan line is running from left to right in the usual fashion of printing. Thus, where the main memory 44 of FIG. 1 stores the printed matter which is to appear in two or more columns, the spacing of the column is set by storing the left-hand marginal position of the second, third, and any subsequent columns in the tab memory 88. The first character to appear in each line of a given column of the second, third, and subsequent column is designated by the TAB signal stored within the storage unit 72. Thereby, the character generator 42 is provided with two items of information, mainly, the beginning character in a line of a column as well as the location of that character in a print line.

The character generator 42 proceeds to generate the characters in a print line until such time as the TAB signal of the storage unit 72 becomes addressed by the counter 70. Thereupon, the generation of characters by the generator 42 is stopped by the TAB signal until such time as the address of the counter 86 reaches the beginning of the next column. In accordance with the value of the starting position for the next column, as stored in the memory 88, upon the addressing of the memory 88 with that value of position, the memory 88 provides a signal to the comparator on line 103. Upon being enabled by the TAB signal, the comparator 90 provides a compare between the signal on line 101, identifying the column, and the signal of the memory 88 on line 103. The compare signal of the comparator 90 reinstitutes the operation of the character memory 76 and its address counter 74.

Reviewing further the operation of comparator 90, the TAB signal serves to enable the comparator when it is desired to provide tabbing functions in the presentation of printed matter. In the preferred embodiment of the invention, sixteen parallel output lines are provided by the character generator address/counter 74. These output lines are used for addressing the components of the character to be printed, or three of the lines are used to identify the particular tab. The latter three bits are fed to the comparator via lines 101. The three bits permit identification of up to seven unique codes, which may be repeated, to which tabbing is to occur.

Line 103, from the tab memory 88, also is a three bit signal identifying the tab. Upon a comparison of the signal on line 103 with the signal on line 101, such comparison indicating that the correct site on the scan line has been reached for the initiation of the next column, the comparator provides a compare signal on line 104 which is fed to the OR gate to increment the address counter 70. In the absence of the TAB enable signal, only a proportional width presentation of the printing appears on the recording medium.

Thereby, the character generator 42 is provided for the capability of printing in the proportional width mode and in the tabbing mode for columnar presentation of printed matter. This dual capability has been provided by the utilization of the circuitry which provides proportional width printing in conjunction with relatively few additional components for converting the generator 42 to the columnar presentation mode of printing. Thereby, both modes of printing can be accomplished with minimal complexity and a corresponding assurance of increased reliability.

As a practical matter in the construction of the printer system, it may be desirable to provide a sensor (not shown) adjacent the recording medium 24 for detecting the actual speed of the medium. An output signal of the sensor could be utilized to drive the system clock so that all drives could be synchronized with the actual speed of the recording medium 24.

The foregoing has described a printing system including the functions of both the proportional width and the columnar presentation.

It is anticipated that aspects of the present invention, other than those specifically defined in the appended claims, can be obtained from the foregoing description and the drawings.

What is claimed is:

1. A printing system for providing a proportional width mode and a columnar mode of presenting printed material comprising:
   a character recording medium;
   means for printing characters on said medium, said medium movable relative to said printing means for the printing of successive lines of said characters;
   timing means for synchronizing movement of said printing means and said recording medium;
   character generator means for driving said printing means, said timing means including a clock for clocking said character generator means, said character generator means comprises a character memory storing components of characters to be printed by said printing means, a separate address of said memory corresponding to each of said stored components;
   counter means for addressing said character memory;
   means for presetting said counter means with the starting address of a character, said counter means counting through successive addresses of the components of the character in response to clock signals of said clock;
   tab memory means for storing a print signal at an address corresponding to the location of the leading edge of a column;
   comparator means for comparing the output of said tab memory means with a tab signal for designating the starting point of a character for positions of characters in a columnar presentation, said character memory including an output circuit for signaling the end of a character for proportional width printing; and
   means for alternatively coupling said presetting means to said output circuit and to said comparator to select a proportional width mode and columnar mode of character presentation.

2. A system according to claim 1 wherein said character generator means further comprises means for addressing said tab memory means at a rate proportional to a rate of printing of said characters in a line of said characters by said printing means.

3. A system according to claim 2 wherein said addressing means is responsive to timing signals of said timing means.

4. A system according to claim 3 wherein said counter means is driven by said timing signals of said timing means.

5. A system according to claim 4 wherein said coupling means includes an OR circuit coupled to said comparator means and to said memory output circuit, and wherein said comparator means and memory output circuit alternately activated by a control signal.

6. A printing system including a character generator for the presentation of characters in modes of proportional width and columnar presentation comprising:
   a counter;
   first and second memories, said first memory storing components of characters at addresses corresponding to counts of said counter and being addressed by said counter and said second memory storing a column-start signal;

means for presetting said counter with the starting address of a character, said starting address corresponding to the first of said components to be generated in a printing of said character, said counter advancing through further values of count to address further character components;

comparator means for comparing the values of signals stored in said second memory with a tab signal, said first memory including an output circuit for designating the completion of a character for the proportional width mode, said comparator means having a compare signal designating the starting position of the first character in a lines of a column for the columnar mode; and means for alternatively coupling said presetting means to said comparator means to said output circuit for selecting the mode of presentation.

7. A system according to claim 6 wherein said counter addresses said first memory.

8. A system according to claim 7 wherein said counter addresses successive components of a character stored in said first memory, said generator further comprising means for addressing said second memory at a rate commensurate with a rate of generation of characters.

9. A system according to claim 8 wherein said coupling means includes means for alternately activating said comparator means and said memory output circuit.

10. A system according to claim 9 wherein said presetting means includes means for storing a set of starting addresses corresponding to a line of printed character components.

11. A system according to claim 10 further comprising means for addressing said storing means of said presetting means, said addressing means for said storing means including a counter of signals applied to said presetting means by said coupling means.

* * * * *